(12) United States Patent
Richmond et al.

(10) Patent No.: US 10,913,186 B2
(45) Date of Patent: Feb. 9, 2021

(54) PHANTOM PRODUCTION TOOL

(71) Applicant: SYNAPTIVE MEDICAL (BARBADOS) INC., Bridgetown (BB)

(72) Inventors: Joshua Richmond, Toronto (CA); Fergal Kerins, Toronto (CA); Sheryl Thingvold, Toronto (CA)

(73) Assignee: SYNAPTIVE MEDICAL INC., Toronto (CA)

( * ) Notice: Subject to any disclaimer, the term of this patent is extended or adjusted under 35 U.S.C. 154(b) by 61 days.

(21) Appl. No.: 16/203,720

(22) Filed: Nov. 29, 2018

(65) Prior Publication Data
US 2019/0099922 A1    Apr. 4, 2019

Related U.S. Application Data

(63) Continuation of application No. 14/917,233, filed as application No. PCT/CA2014/050975 on Oct. 9, 2014, now Pat. No. 10,144,154.

(51) Int. Cl.
*B29C 33/00*   (2006.01)
*B29C 39/22*   (2006.01)
(Continued)

(52) U.S. Cl.
CPC .............. *B29C 39/22* (2013.01); *B29C 33/10* (2013.01); *B29C 33/20* (2013.01); *B29C 33/306* (2013.01); *B29C 33/3835* (2013.01); *B29C 33/3857* (2013.01); *B29C 44/02* (2013.01); *B29C 44/1219* (2013.01); *B29C 45/0001* (2013.01); *B33Y 10/00* (2014.12); *B33Y 50/02* (2014.12); *B33Y 80/00* (2014.12); *G09B 23/30* (2013.01); *B29K 2029/04* (2013.01); *B29K 2031/04* (2013.01); *B29K 2105/0061* (2013.01); *B29K 2883/00* (2013.01); *B29L 2031/40* (2013.01); *B29L 2031/753* (2013.01)

(58) Field of Classification Search
CPC .............. B29C 33/0011; B29C 33/306; B29C 45/2673; B29C 45/2675
See application file for complete search history.

(56) References Cited

U.S. PATENT DOCUMENTS

| | | | |
|---|---|---|---|
| 2005/0202381 A1* | 9/2005 | Keegan | G09B 23/286 434/262 |
| 2010/0047752 A1* | 2/2010 | Chan | G09B 23/32 434/272 |

(Continued)

FOREIGN PATENT DOCUMENTS

DE    10025804 A1 * 11/2001 ........... B29C 64/153

OTHER PUBLICATIONS https://www.youtube.com/watch?v=zLC71-04R2o (Year: 2008).*

*Primary Examiner* — Timothy Kennedy

(57) ABSTRACT

The present disclosure relates to a tool used to producing anatomical phantoms. The tool includes an inner flexible mold which sits inside a rigid, thermally conductive outer shell. The rigid shell may be made out of aluminum. The silicone mold and thermally conductive shell both include at least two interlocking components. The shell is held together by a locking mechanism which can expand upon internal pressure. An anatomical phantom is produced from polyvinyl alcohol hydrogel by freezing and thawing a PVA liquid precursor in the silicone mold and demolding it.

6 Claims, 8 Drawing Sheets

(51) Int. Cl.
  *B29C 33/30* (2006.01)
  *G09B 23/30* (2006.01)
  *B33Y 10/00* (2015.01)
  *B33Y 50/02* (2015.01)
  *B33Y 80/00* (2015.01)
  *B29C 33/10* (2006.01)
  *B29C 33/20* (2006.01)
  *B29C 33/38* (2006.01)
  *B29C 44/02* (2006.01)
  *B29C 44/12* (2006.01)
  *B29C 45/00* (2006.01)
  *B29K 31/00* (2006.01)
  *B29K 105/00* (2006.01)
  *B29L 31/40* (2006.01)
  *B29L 31/00* (2006.01)
  *B29K 29/00* (2006.01)

(56) References Cited

U.S. PATENT DOCUMENTS

2013/0040110 A1* 2/2013 Matsui ............... B29C 64/165
                                                        428/156
2013/0221580 A1* 8/2013 Bishop ............... B29C 33/202
                                                        264/479

\* cited by examiner

PHANTOM PRODUCTION TOOL

This application is a continuation of U.S. patent application Ser. No. 14/917,122, filed on Mar. 7, 2016, for an invention entitled "Phantom Production Tool", which is the national phase entry of International Application No. PCT/CA2014/050975, filed on Oct. 9, 2014, for an invention entitled "Phantom Production Tool", the contents of which are incorporated herein by reference. The current disclosure relates to a phantom production tool for making anatomical phantoms.

FIELD

Background

Phantoms made from PVA hydrogel/cryogel with realistic tactile and haptic properties of the tissues they simulate have by their very nature low mechanical strength and high weight to strength ratios. The process for preparing the phantoms requires thermal transfer away from the material to achieve accurate and repeatable low temperatures to achieve the desired properties. Traditionally, standard tools (and molds) for soft materials are formed entirely from silicone, or from silicone held by a plaster cast exterior so that there is poor thermal conductivity. Soft phantom production tools on their own have a limited life and cannot support inserts for precise insertion of overmolded components.

Thus there is a need for an anatomical phantom production tool that has good thermal conductivity during setting of the PVA material and is rigid to prevent mishaping of the phantom during curing due to unconstrained swelling in the soft silicone mold.

SUMMARY

The present disclosure provides a phantom production tool for producing anatomical phantoms. The tool includes an outer rigid, thermally conducing shell comprised of at least two outer rigid shell sections which when being used to produce an anatomical phantom are assembled together to form a rigid outer housing enclosing a volume. The tool includes an inner flexible mold which also includes at least two flexible sections with each section being seated in an associated outer rigid shell section. The two flexible sections, when seated in their respective rigid shell sections and the entire tool is assembled, define an inner volume between them. This inner volume has the shape and size of the anatomical phantom to be produced. The rigid shell sections and inner flexible mold sections each have aligned access ports for flowing a liquid precursor of a tissue mimic material of the anatomical phantom into the interior volume of the flexible mold. Each of the outer rigid shell sections and inner flexible mold sections have aligned vents to allow venting of any gases generated during setting or curing of the liquid precursor as it solidifies to form the anatomical phantom. The flexible mold is produced in a way which ensure the inner flexible mold sections are in thermal/physical contact with an inner surface of the outer rigid shell sections.

The outer rigid shell housing sections are assembled together confining the flexible mold section in an interior chamber formed by the rigid shell sections and a locking mechanism locks the at least two shell sections together. The locking mechanism is configured to allow the at rigid shell sections to expand away from each other during buildup of pressure as the liquid precursor cures, and to contract back towards each other as venting of the gases from the inner volume defined by the flexible mold occurs.

To produce an anatomical phantom, the flexible mold is first produced having an interior volume and shape corresponding to the anatomical part. To produce the flexible mold, a 3D model of the anatomical part is produced and then positioned and secured within the interior volume of a first of the two rigid shell members. Shim(s) having an inner circumferential edge substantially matching a circumferential path around the 3D model are then placed around the 3D model supported by a peripheral surface of the rigid shell member. The second rigid shell member is then assembled with the first shell section and the rigid outer shell sections are then secured together using the locking mechanism. A liquid precursor for the flexible mold material is flowed into and fills the interior volume formed by the assembled rigid shell members until the 3D model is completely enveloped by the precursor liquid. Once the precursor liquid for the flexible mold material is cured, the two rigid shell members are disassembled and the flexible mold containing the 3D model is removed. The presence of the shim(s) ensures the flexible mold is produced in two separate flexible mold sections since the shim(s) act as a divider in the interior volume defined by the two rigid shell sections since the inner peripheral edge of the shim(s) have the contour of an outer circumferential path around the outer surface of the 3D model. Filling the internal volume between the outer surface of the 3D model and the inner surface of the outer assembled shell sections ensures the resulting flexible mold has an interior volume, shape and inner surface topography representative of the volume, shape and outer surface topography of the 3D model. Each of the flexible mold sections sits in its associated rigid shell section in good thermal contact when inserted there.

Once the inner flexible mold has been produced an access port and vent is produced in each section aligned with the access port and vent in the associated outer rigid shell section.

Once the inner flexible mold has been produced, anatomical phantoms having the shape, size and surface topography of the 3D model can be produced by encasing the flexible mold sections in their associated rigid shell sections, locking the at least two rigid shell sections together and then flowing a liquid precursor for the tissue mimic for the anatomical part through the aligned access ports in the outer rigid shell sections and the inner flexible mold sections to fill the interior volume formed in the interior of the assembled flexible shell. The liquid precursor is then cured, and any increase in internal pressure that develops causes the two rigid shell sections to expand away from each other due the nature of the locking mechanism and upon being vented from the interior the two shell portions can move back towards each other.

The increased pressure in the case of phantoms produced using the present phantom production tool comes from a change in density/volume as the liquid formulation changes state from a liquid to a solid. The density of ice is ~0.92 g/mL and the volume increase is approximately 8%.

Phantoms made from polyvinyl alchol (PVA hydrogel/cryogel) require one or more thermal cycles to cure and produce the cyrogel. In this case good thermal conductivity is needed between the liquid during curing and this is provided by the good thermal contact between the inner flexible mold and the outer thermally conductive rigid shell.

BRIEF DESCRIPTION OF THE DRAWINGS

Embodiments will now be described, by way of example only, with reference to the drawings, in which.

DETAILED DESCRIPTION

Without limitation, the majority of the systems described herein are directed to a production tool to for producing anatomical phantoms. As required, embodiments of the present invention are disclosed herein. However, the disclosed embodiments are merely exemplary, and it should be understood that the invention may be embodied in many various and alternative forms.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. The drawings are for the purposes of teaching and not limitation, the illustrated embodiments are directed to a mold or a tool to create an imaging phantom; particularly one used for the sulcus or other neuro-anatomical component.

As used herein, the term "about", when used in conjunction with ranges of dimensions, temperatures or other physical properties or characteristics is meant to cover slight variations that may exist in the upper and lower limits of the ranges of dimensions as to not exclude embodiments where on average most of the dimensions are satisfied but where statistically dimensions may exist outside this region. For example, in embodiments of the present invention dimensions of the mold or tool may be given but it will be understood that these are not meant to be limiting.

As used herein, the term "patient" is not limited to human patients and may mean any organism to be treated using the planning and navigation system disclosed herein.

As used herein, "hydrogels" refer to materials that are formed by crosslinking polymer chains, through physical, ionic or covalent interactions and are known for their ability to absorb water. An example of a physical interaction that can give rise to a hydrogel is by thermal treatment of the liquid hydrogel precursor which, prior to being subjected to a freeze thaw cycle is a liquid or near liquid. The process of freezing the liquid precursor acts to freeze the water contained in the polymer/water mixture and ice particles causes the polymer strands to be topologically restricted in molecular motion by other chains thus giving rise to the "entanglement" cross linking to produce the hydrogel. Hydrogels that have been produced by a freeze that cycle are sometimes referred to as "cryogels".

Hydrogels characterized by cross linking that are produced through ionic or covalent interactions typically require a cross linking (XL) agent and/or an initiator and activation by methods such as heat or radiation.

Figure 1:
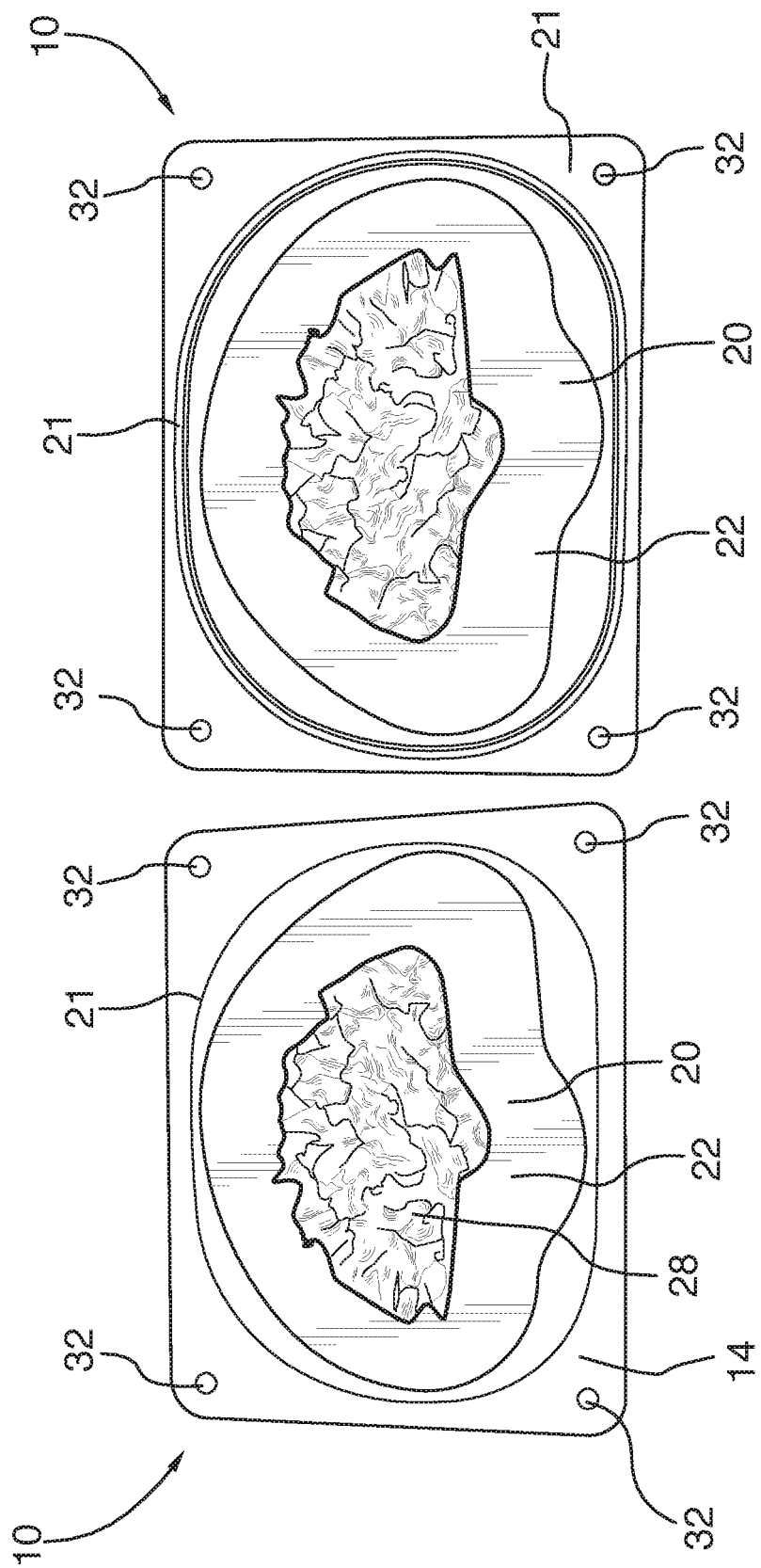
FIG. 1 shows a top view of a phantom production tool laid open showing a rigid outer shell formed of two sections with a corresponding section of an inner flexible mold located in its corresponding rigid shell section.
Figure 2:
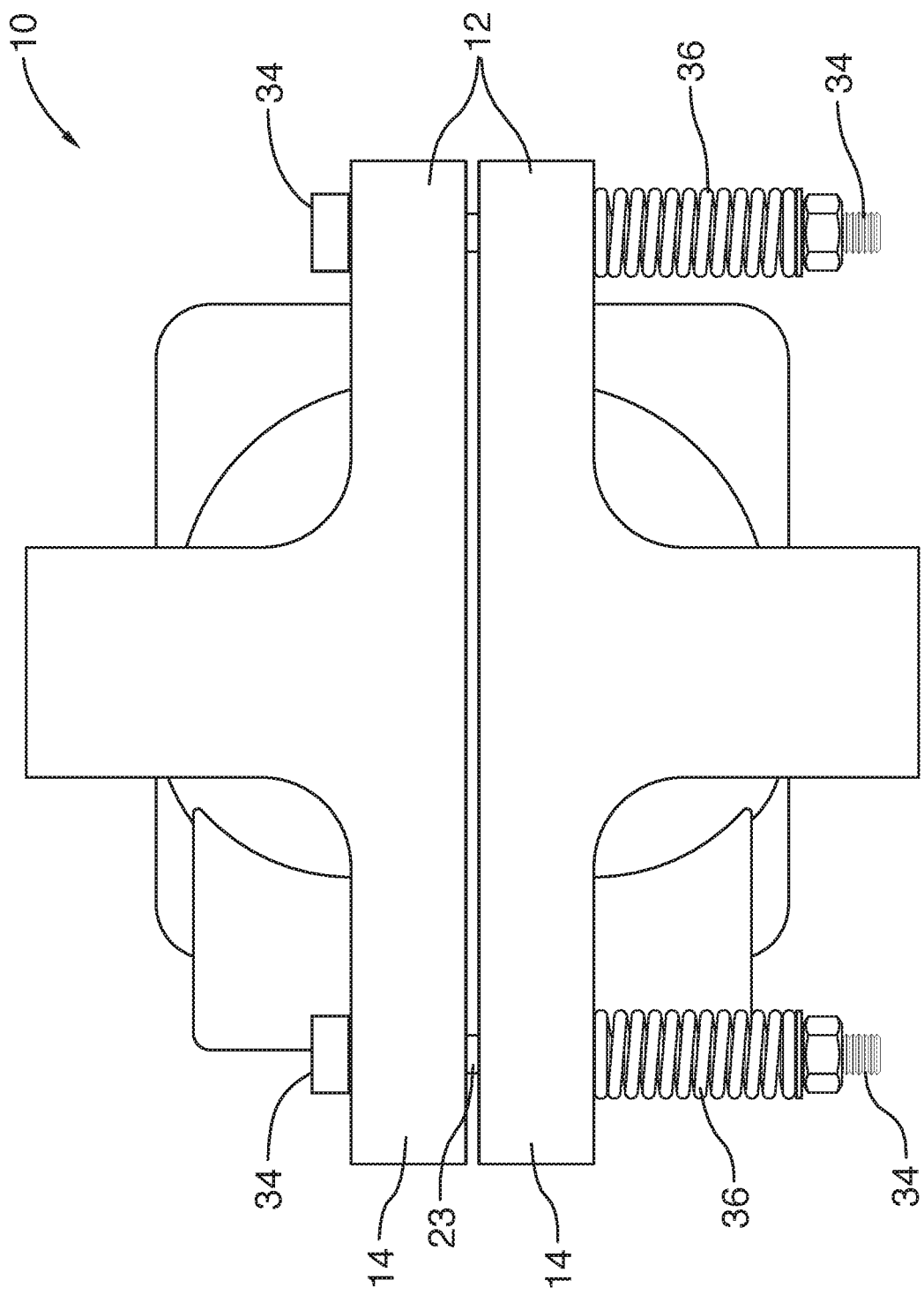
FIG. 2 is a perspective view of the phantom production tool of FIG. 1 assembled together.
Figure 7:
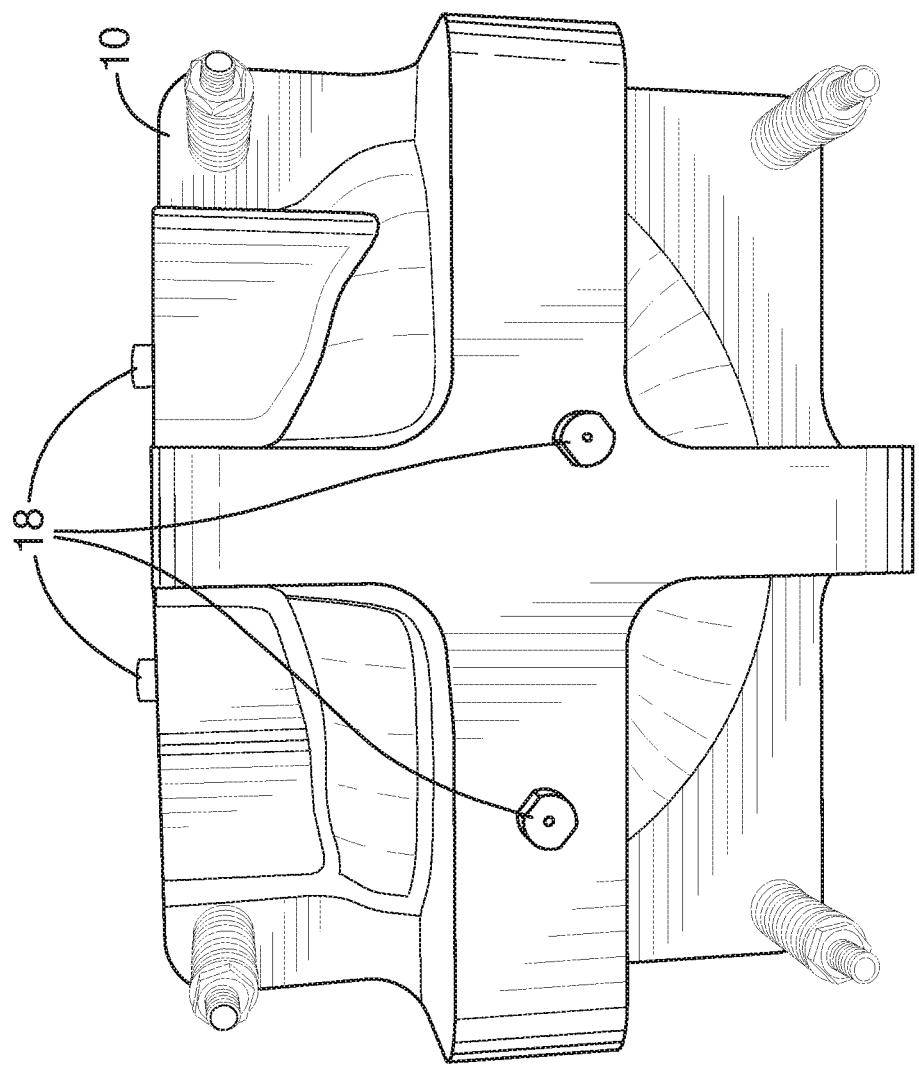
FIG. 7 shows a perspective view from one side of the phantom production tool assembled together ready to be used to produce a phantom.
Figure 8:
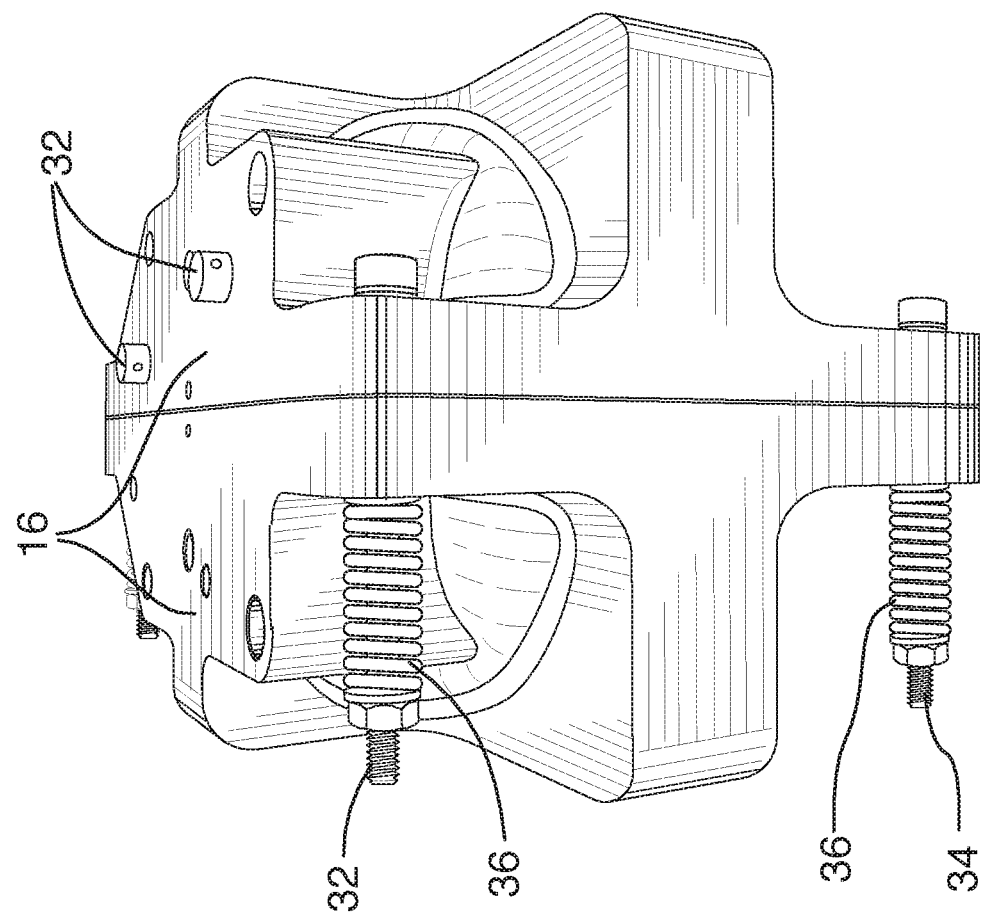
FIG. 8 shows is another perspective view from a different side to that of FIG. 7 of the phantom production tool assembled together ready to be used to produce a phantom.

Referring to FIGS. 1 and 2, an embodiment of an anatomical phantom production tool 10 includes a rigid thermally conductive shell 12 formed from at least two rigid thermally conductive sections 14 which when assembled together form the rigid thermally conductive shell 12 which encloses an interior volume. As shown in FIG. 8, each rigid thermally conductive section 14 has an access port 16 and a vent port 18 (also seen in FIG. 7) extending through its side wall into the interior volume when the two sections 14 are assembled together. An o-ring groove 21 (FIG. 1) located on the inner facing faces of each section 14 allows for an o-ring 23 (FIG. 2) to be placed between the inner faces when sections 14 are assembled with each other to give a flexible seal between the two sections 14 when they are bolted together.

Tool 10 includes a flexible mold 20 including at least two flexible sections 22 each sitting in a corresponding rigid shell section 14 as seen in FIG. 1. The two flexible mold sections 22 when assembled together sit in the enclosed volume formed by rigid sections 14. When mold sections 22 are assembled when placed in their associated rigid section 14 with the latter two sections bolted together, an internal volume 28 is produced in mold 20. Flexible mold 20 includes access ports and vent ports (not shown) aligned with ports 16 and 18 in the rigid shell 12 so that a liquid precursor to the phantom tissue mimic material can be injected into the interior volume enclosed by mold 12 and any gas buildup in the internal volume 28 during curing or setting of the liquid precursor can be vented.

While FIGS. 1 and 2 show the rigid mold shell 12 and flexible mold 20 formed into two (2) halves, it will be understood that both may be made from more than two sections, depending on the structure/shape/functionality of the anatomical part for which the phantoms are being produced. The sections 14 of rigid shell 12 are made of a thermally conductive material, such as but not limited to aluminum. Flexible mold 20 is made of a flexible polymer such as but not limited to silicone. When flexible mold sections 22 are assembled with their associated rigid shell sections 14, the outer surface of mold sections 22 are in physical/thermal contact with the inner surface of rigid shell sections 14 so that conductive rigid shell 12 dissipates heat away from mold 20 when the mold is fully assembled. The interior surface of flexible mold 20 formed by assembling the two sections 22 together has a surface topography that is the same as the outer surface of the anatomical part for which the phantom is being produced.

Tool 10 includes a locking mechanism for locking the assembled thermally conductive rigid shell sections 14 together. The locking mechanism is configured to allow the thermally conductive shell sections 14 to expand away from each other upon generation of internal pressure and contract back towards each other upon release of this internal pressure. Referring to FIG. 1, in a non-limiting embodiment of a locking mechanism, each rigid thermally conductive sections 14 each have two (2) or more (four (4) is preferable)

bolt holes 32 aligned with bolt holes 32 in the other rigid thermally conductive section 14. Bolts 34 (FIG. 2) each having a compression spring 36 associated therewith such that when the two rigid thermally conductive sections 14 are bolted together, they can expand upon a build-up of internal pressure developed in the interior volume of the flexible mold 20 acting on the locking mechanism.

Figure 3:
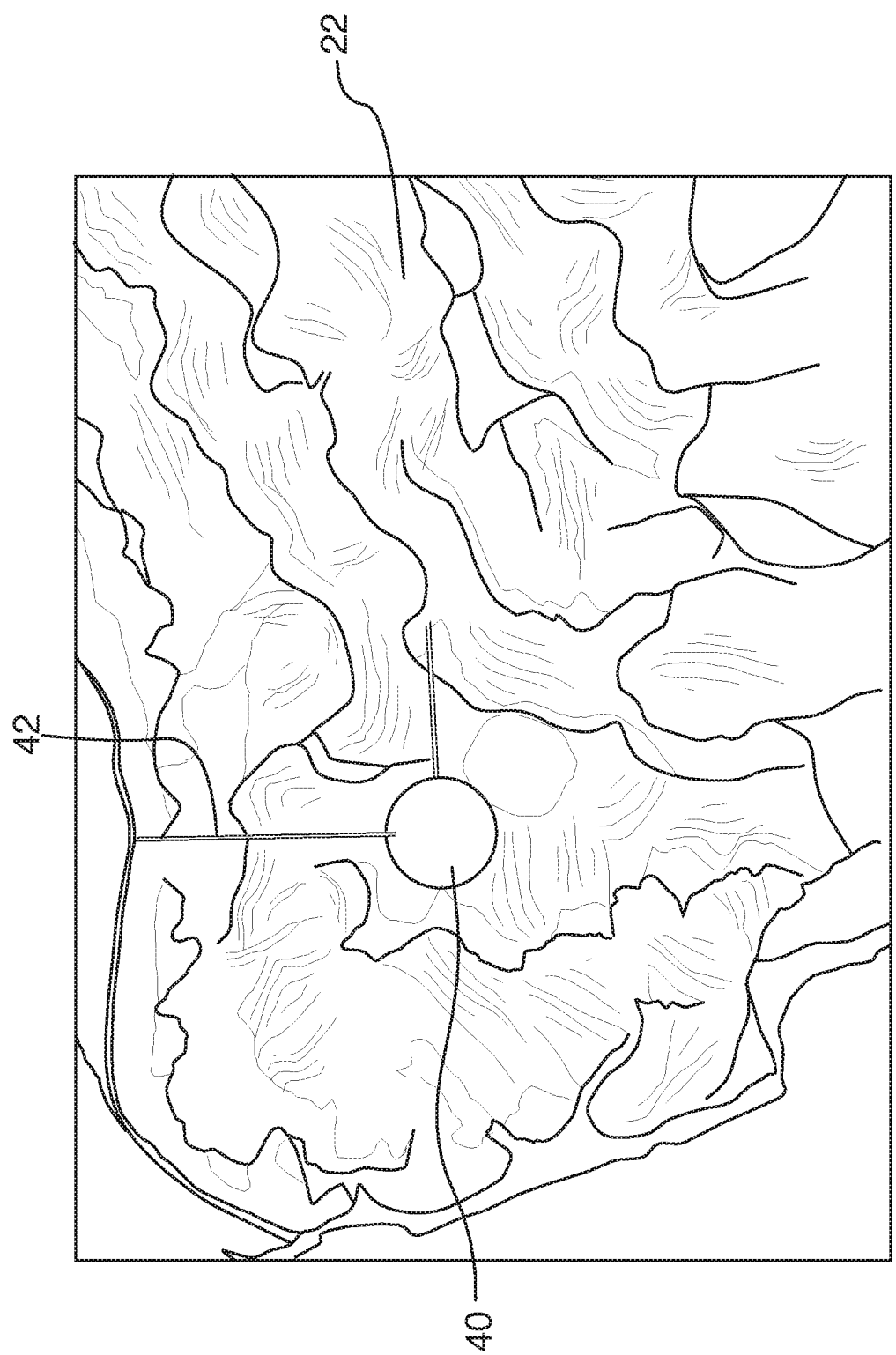
FIG. 3 shows the interior of a flexible phantom section with a structural feature supported in a selected location using a support mechanism in an embodiment of the tool.

The phantom production tool 10 may include a removable support mechanism for supporting one or more structural features in the interior volume of the flexible mold 20. Such structural features may be representative of anomalous tissue such as tumors, lesions, blood clots etc. and may be produced of materials selected to mimic the biomechanical and/or imaging properties of actual anomalous tissue. The removable support mechanism includes one or more support rods with the rigid thermally conductive shell and the flexible mold including one or more aligned access ports to receive one or more support rod. Referring to FIG. 3, a structural feature 40 (a tumor mimic) is shown supported by a rod 42 within the interior volume of a mold section 22. The one or more support rods 42 are configured to hold one or more structural features in specific locations within the interior volume of the flexible mold 20.

Figure 4:
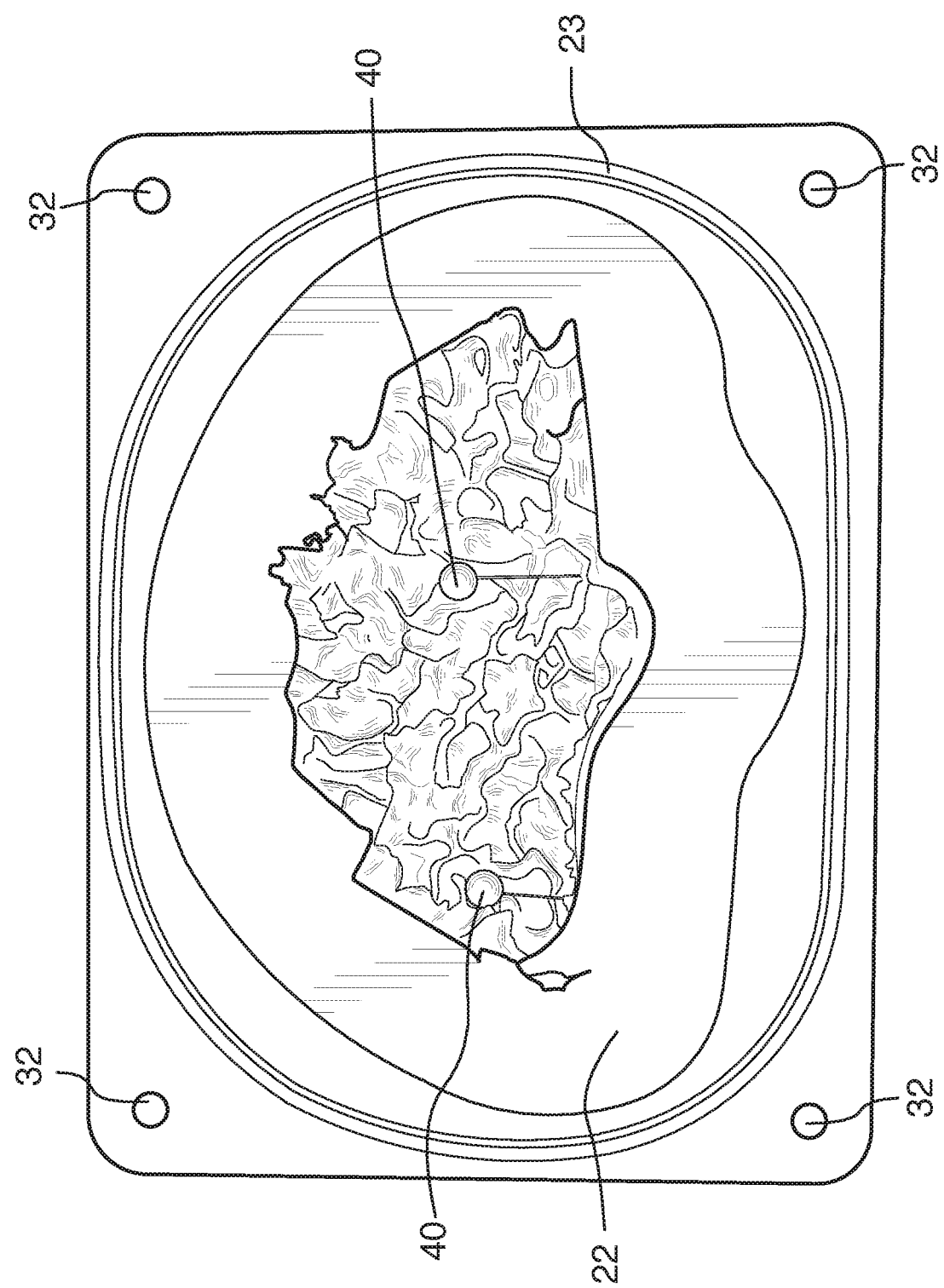
FIG. 4 is a top view of a section of the phantom production tool showing a flexible mold section seated within its associated rigid mold section and showing two (2) structural features supported in its interior volume.

FIG. 4 shows two (2) structural features 40 supported in the interior volume of mold section 22. The rigid shell sections 14 have holes extending through the side wall and angled at various angles so different support rods inserted through different locations can intersect to provide more than one support for the one or more structural feature being supported within the internal volume of the flexible mold.

Figure 6:
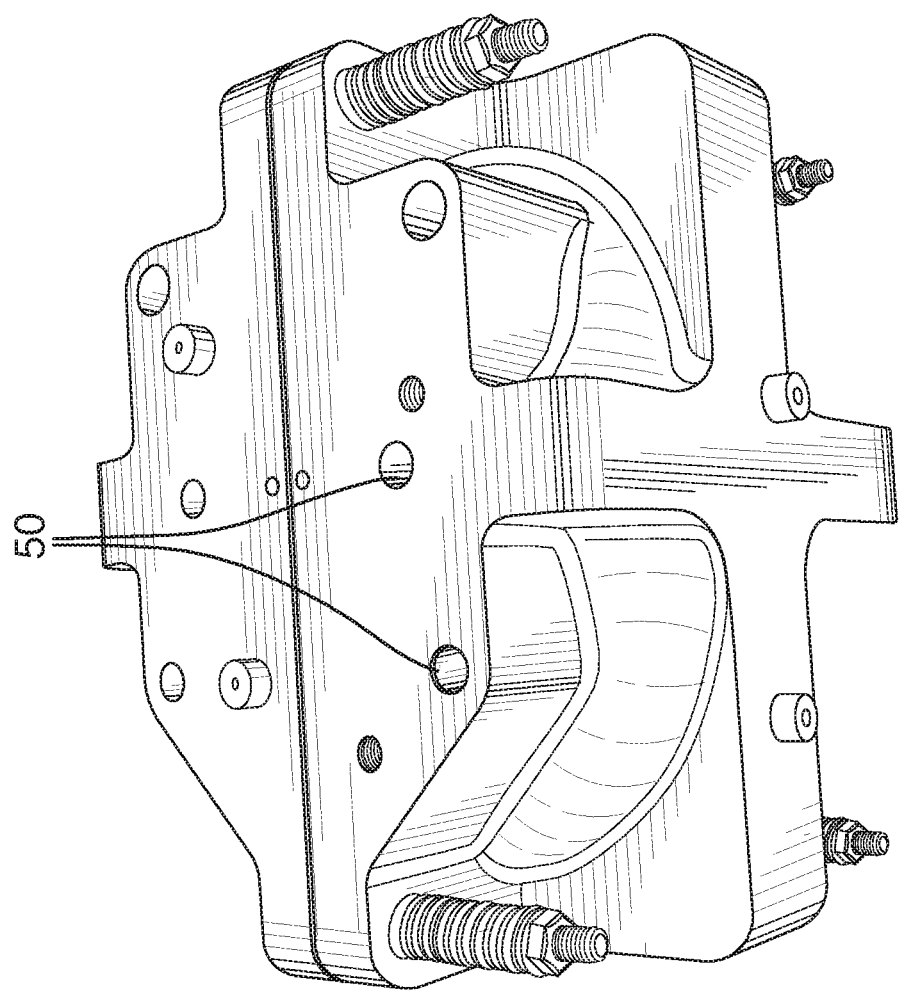
FIG. 6 is a perspective view from a top of the phantom production tool assembled together ready to be used to produce a phantom.

Referring to FIG. 6, the holes 50 in the side wall of rigid shell sections 14 may be threaded and the proximal ends of the support rods 42 may have matching threads so that the support rods 42 can be threaded into the sections 14 to rigidly hold them in place. The support rods 42 are very thin, such as needles and once the phantom with the embedded structural features 40 has been produced the support rods 42 are removed since the structural features 40 will be supported in the internal volume by the remainder of the tissue phantom material.

In an embodiment, the interior volume 28 of the flexible mold 20 has a shape and size of a human brain, and is produced, as discussed below, with a surface topography to emulate sulcal folds of the human brain.

In order to produce a biomechanical and/or optical anatomical phantom of a given anatomical part using the aforementioned phantom production tool 10, first the flexible mold 20 comprised of at least the two parts 22 needs to be produced. Thus the interior volume of the assembled rigid shell 12 needs to be greater than the volume of the 3D model so that it can be completely enveloped by the precursor mold material. A 3D model of the given anatomical part is placed in the interior volume of one of the rigid shell section 14. It is noted that the 3D model has a surface topography reflective of the surface topography of the given anatomical part as will be discussed shortly.

Figure 5:
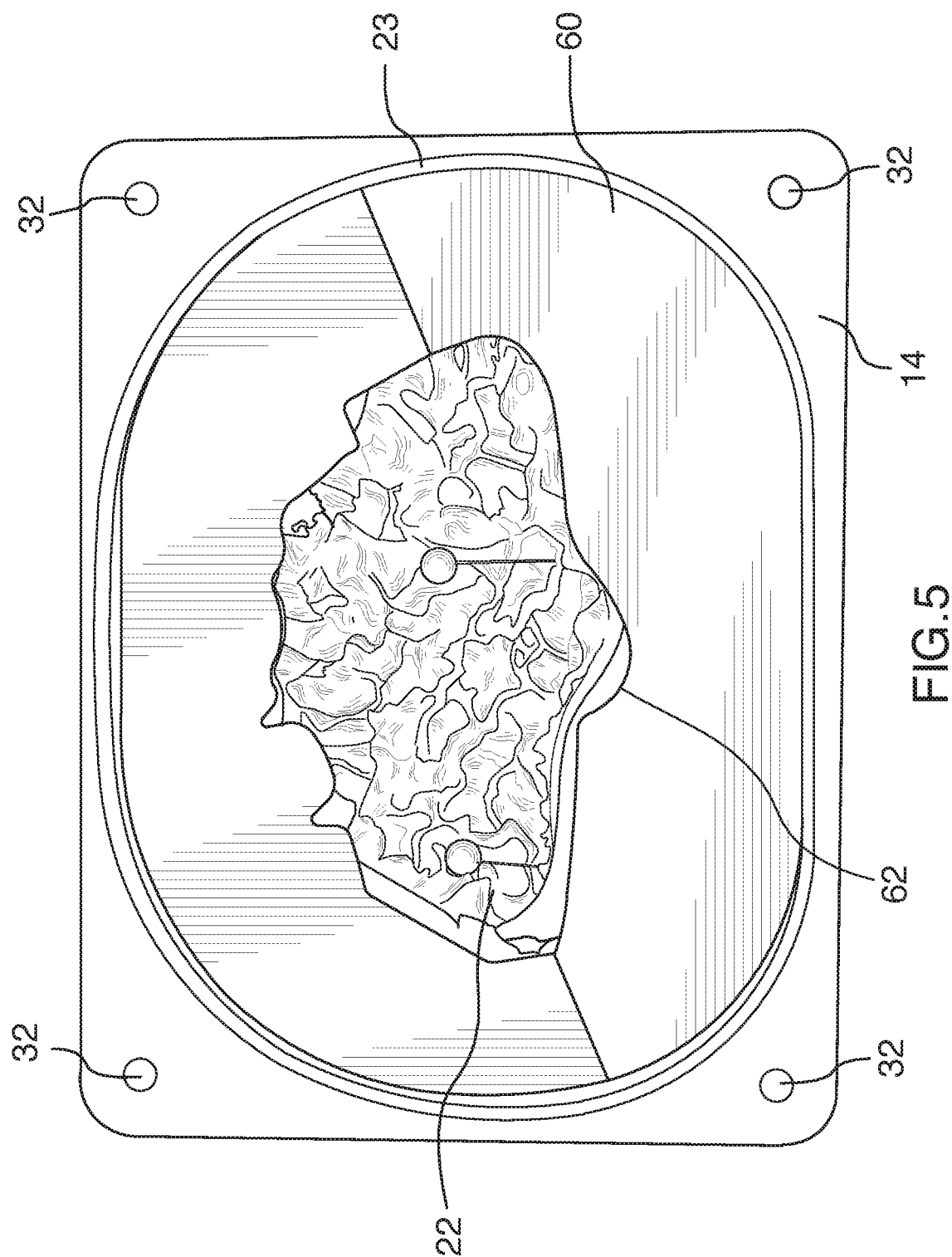
FIG. 5 is the same top view as shown in FIG. 4 but now includes a pair of shims resting on an annular portion of the rigid mold section.

Referring to FIG. 5, a pair of matching, flat planar shims 60 having an inner peripheral edge 62 having a shape roughly matching the shape of a circumferential section of the the outer surface of the 3D model are supported by an annular section of one of the rigid housing sections 14 between the o-ring grove 21 and o-ring 23 and the peripheral edge of the inner volume of the rigid section 14 in which mold section 22 sits, which can be seen by comparing FIG. 4 (absent the shims 60) and FIG. 5 having the shims 60 in place. The purpose of the presence of shims 60 is to be able to produce mold 20 in the two (2) sections 22 so that they are separate from each other. This is achieved by the inner peripheral edge 62 of shim 60 touching or being in close contact with a circumferential path around the periphery of the 3D model.

Once the 3D model has been mounted and the pair of shims 60 placed on section 14, the two rigid sections 14 are secured together and a liquid precursor for the flexible mold material 20 is injected into the interior volume of the rigid shell 12 to completely envelope the 3D model of the given anatomical part. The liquid precursor is then cured to produce the flexible mold fully encasing the 3D model thus producing a negative of the anatomical part in the rigid shell 12.

Thereafter the shell 12 is disassembled by separating rigid sections 14 from one another and the flexible mold containing the 3D model is removed. The flexible mold sections 22 are then separated and the 3D model is removed to give the at least two sections 22 of the flexible mold 20 having an inner surface topography reflective of the outer surface topography of the given anatomical part and an inner volume corresponding to a volume of the anatomical part. The flexible mold 20 is complementary in shape to the rigid shell since the latter was filed with the liquid precursor so that when assembled with the rigid shell 12 both units fit together very well. An access port and a vent port are then produced in the two (or more) flexible sections 22 which are aligned with access ports 16 and vents 18 in sections 14.

The 3D model may be produced by acquiring imaging data of the given anatomical part of a patient destined to undergo a medical procedure on the given anatomical part, such as the brain. The 3D model is then printed or otherwise produced from the imaging data and has the shape, size and surface contours of the patient. The locations of anomalous tissue is then identified from the imaging data and phantoms with the size and shape of the anomalous tissue (such as tumors) may then be produced.

There are two possible scenarios with respect to producing the actual anatomical phantom. In the first scenario, a generic or standard phantom to be produced with no anomalous tissue structures 40 embedded, such as for example a healthy brain, which is being produced simply to practice imaging or general surgical procedures. In this case, once the 3D model has been produced, the flexible mold sections 22 are mounted in their corresponding rigid shell sections 14 and with the access ports 16 and vent holes 18 and in rigid shell sections 14 aligned with the corresponding access ports and vent holes in the corresponding flexible sections 22. The rigid shell sections 14 are then assembled and secured together using the locking mechanism, as shown in FIG. 2 using the spring loaded bolt assemblies 34, 36.

Once the full phantom production tool is assembled as shown in FIG. 2, liquid precursor of the anatomical phantom material itself is injected into the inner volume formed by the two sections 22 of the flexible mold, and once filled up setting or curing of the liquid precursor is induced to produce the anatomical phantom and after the liquid has set the rigid shell 12 is disassembled and the flexible mold is removed from shell sections 14 and the two sections 22 of the flexible phantom 20 are separated and the anatomical phantom itself is removed therefrom.

In the second scenario, phantoms are produced containing of anomalous tissue structures embedded therein. In this scenario, prior to assembling the rigid shells 14 together with the flexible mold sections 22 contained therein, phantoms representing the anomalous tissue structures 40 are supported in the desired locations using the support structure 42 discussed above. Once structure(s) 40 have been located and properly supported in the interior volume of one of the sections 22, the rigid shell sections 14 are assembled and bolted together. The same process of filing the assembled flexible mold 20 with the liquid precursor is then undertaken as is the rest of the process of curing and removing the produced phantom, with the exception that the support rods/needles 42 may be withdrawn prior to disassembly.

The flexible mold 20 once formed may be used many times to produce as many anatomical phantoms as may be needed for either generic use or for a specific patient.

The material being used to form the anatomical phantom may be selected to exhibit biomechanical properties of the anatomical phantom, selected imaging properties of the anatomical phantom, or a combination of both. Similarly, the phantoms of the one or more anomalous structural features are produced of materials which mimic biomechanical properties of the one or more anomalous structural features.

The material used to produce tissue mimics of the anatomical phantoms may be based on polyvinyl alcohol cryogel (PVA-C). Details of these materials and how to produce phantoms are disclosed in U.S. Patent Publication No. 2016/0027341, which is the US publication of U.S. patent application Ser. No. 14/337,614, filed Jul. 22, 2014, entitled "METHOD FOR PRODUCING ANATOMICAL PHANTOMS WITH CONSTITUENTS HAVING VARIABLE DENSITIES," the contents of which are incorporated herein by reference in its entirety; and U.S. Patent Publication No. 2016/0155364, which is the US publication of U.S. patent application Ser. No. 14/903,807, filed on Jan. 8, 2016, entitled "SURGICAL TRAINING AND IMAGING BRAIN PHANTOM," which is the U.S. national phase application of International Application No. PCT/CA2014/050659, filed on Jul. 10, 2014, entitled "SURGICAL TRAINING AND IMAGING BRAIN PHANTOM," the contents of which are incorporated herein by reference in its entirety.

On freezing, the PVA can increase in volume by up to 7% depending on the PVA concentration in the precursor formulation. An embodiment of a phantom production tool may include (8) equal segments of the outer rigid thermally conductive sections held together with compression springs allows expansion in all directions thus maintaining the shape/aspect of the PVA phantom. To give a smooth surface, prevent leaks, allow for pouring of PVA formulation and for fiber positioning a silicone sphere (recommend at minimum wall thickness of 4 mm) should line the inner surfaces of the assembled outer rigid sections along x, y, z, axes, curved paths along xy, xz, yz plains and curves in xyz planes. In addition, for curved pathways a jig/needle assembly may be used for threading through the tool.

Once the phantom has been produced, it may be stored for shipment in a housing which be injected molded polycarbonate (IM PC) or acrylic which could comprise two (2) halves that seal together with a gasket and tongue and groove followed by a glueing and sterilization procedure. For a spherical (or cylindrical phantom) pins or spikes may be arranged on the interior surface to grip the PVA phantom and prevent rotation. Other housing materials may include thermoset plastics, including but not limited to Acrylonitrile Butadiene Styrene (ABS) plastic, polyurethane and other suitable thermoplastic polymeric material. Further, known pressure die casting processes such as "metal injection molding", utilizing low melt temperature alloys, may also be used.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method of producing a flexible mold for a given anatomical part having at least two mold sections, comprising:
   a) mounting a 3D model of the given anatomical part in an internal volume of a rigid thermally conducting housing formed from at least two rigid housing sections, dividing the internal volume between the 3D model and an interior wall of the assembled housing sections into two separate compartments with the 3D model straddling the two separate compartments;
   b) locking the two housing sections together using a locking mechanism configured to allow expansion of the at least two rigid sections away from each other upon generation of internal pressure in the internal volume and contraction back together upon release of internal pressure;
   c) injecting a liquid precursor of a flexible mold material separately into the two separate compartments through access ports located in a sidewall of each rigid housing section substantially enveloping the 3D model;
   d) curing the liquid precursor in each compartment to produce two substantially separate flexible mold sections encasing the 3D model and venting any gases produced from the curing out of the interior volume through vent holes in each rigid housing section;
   e) disassembling the two sections and removing each of the two separate flexible mold sections from its associated rigid housing section, removing the two separate flexible mold sections from the 3D model to give at least two sections of the flexible mold having an inner surface topography reflective of the outer surface topography of the given anatomical part and an inner volume corresponding to a volume of the anatomical part; and
   f) producing a liquid access port and vent port in the two flexible mold sections aligned with liquid access ports and vent ports in their associated rigid housing section.

2. The method according to claim 1 wherein said liquid precursor is uncured liquid silicone and the flexible mold is made of silicone.

3. A method of producing an anatomical phantom of the given anatomical part using the housing and flexible mold according to claim 1, including:
   a) mounting each of the two flexible mold sections into its associated rigid housing section with the liquid access ports and vent ports of each aligned with the liquid access ports and vent ports of its associated rigid housing section;
   b) locking the two rigid housing sections together using the locking mechanism;
   c) injecting a liquid precursor to a material being used to form an anatomical phantom of the given anatomical part into an inner volume defined by the two sections of the flexible mold, inner volume having a size and shape substantially the same as a size and shape of the 3D model; and
   d) inducing setting of the liquid precursor to produce the anatomical phantom and after the liquid has set, disassembling the thermally conductive rigid shell and the flexible mold and removing the anatomical phantom therefrom.

4. The method according to claim 1, wherein prior to step a), producing the rigid 3D model by the steps of a) acquiring imaging data of the given anatomical part of a patient to undergo a medical procedure on the given anatomical part; and
b) producing the rigid 3D model of the given anatomical part from the imaging data.

5. The method according to claim 3 wherein the material being used to form the anatomical phantom is selected to exhibit biomechanical properties of the anatomical phantom, optical properties of the anatomical phantom, or a combination of both.

6. The method according to claim 3 wherein said liquid precursor is a precursor to a polyvinyl alcohol cryogel.

* * * * *